United States Patent [19]

Fisher et al.

[11] 4,456,990
[45] Jun. 26, 1984

[54] PERIODIC WAVE ELIMINATION BY NEGATIVE FEEDBACK

[76] Inventors: Charles B. Fisher, 2850 Hill Park Rd., Montreal, Quebec, Canada, H3H 1T1; Sidney T. Fisher, 53 Morrison Ave., Montreal, Quebec, Canada, H3R 1K3

[21] Appl. No.: 347,517

[22] Filed: Feb. 10, 1982

[51] Int. Cl.³ .................................... H04J 15/00
[52] U.S. Cl. ............................... 370/119; 455/296
[58] Field of Search ............... 455/296, 295, 311, 312, 455/212, 283; 370/119, 118, 18, 19

[56] References Cited

U.S. PATENT DOCUMENTS

| | | | |
|---|---|---|---|
| 4,249,260 | 2/1981 | Fisher et al. | 455/296 |
| 4,268,914 | 5/1981 | Fisher et al. | 370/118 |
| 4,308,614 | 12/1981 | Fisher et al. | 370/119 |

OTHER PUBLICATIONS

Modulation Theory, by H. S. Black, New York, 1953, pp. 48, 57, 103.

*Primary Examiner*—Douglas W. Olms

[57] ABSTRACT

Means and method for substantially eliminating a selected periodic wave from a frequency band-limited combined wave containing other waves. The combined wave is sampled in a sampling gate, opened by short gating pulses with a frequency equal to the selected frequency divided by an integer, and greater than the Nyquist frequency for the combined wave, timed from the selected periodic waves. The samples are reconstructed in a filter with the pass-band equal to the frequency band of the combined wave. The direct-current component in the output of the sampling gate, due to any error in the timing of the instants, is used in a negative-feedback circuit to adjust the sampling instants so that the periodic wave is substantially completely eliminated.

3 Claims, 2 Drawing Figures

PERIODIC WAVE ELIMINATION BY NEGATIVE FEEDBACK

BACKGROUND OF THE INVENTION

Method and means for eliminating a selected periodic wave of selected frequency, such as an unmodulated or an amplitude modulated carrier, of which the frequency is herein considered as the frequency of the periodic wave, from a frequency band containing other periodic waves with different frequencies, and non-periodic waves, by sampling and reconstruction means timed from the selected frequency, and by feedback of direct current from the output of the sampling means to the timing circuits.

In the prior art, substantially complete elimination of unwanted waves from a frequency band is disclosed in U.S. Pat. No. 4,249,260, class 455/296, for Noise-Reducing Apparatus, issued Feb. 3, 1981 to Fisher et al, and in U.S. Pat. No. 4,268,914, class 370/118, for Receiving Apparatus for Messages With In-Band Signalling, issued May 19, 1981 to Fisher et al. Neither of these patents discloses negative feedback of dc to the sampling timing circuits, to adjust the sampling instants, which materially improves the elimination of the selected periodic wave, as in this invention.

This invention has utility for use in noise-reduction circuits of the prior art, and in radio and sound location and ranging apparatus, which receives a reflected wave and suppresses a direct wave.

BRIEF DESCRIPTION OF THE INVENTION

This invention discloses method and means for substantially completely eliminating a selected periodic wave of selected frequency, such as a carrier or an amplitude modulated carrier, from a band-limited combined wave containing other waves.

The combined wave is sampled by a sampling gate for short periods at instants of zero-crossings of the carrier of the selected periodic wave, at a frequency equal to the selected periodic wave frequency divided by an integer, and greater than the Nyquist frequency for the combined wave. The dc component of the resultant sequence of short samples of the combined wave is used in a negative-feedback circuit to adjust the sampling instants, thus reducing the amplitude of the portion of the periodic wave which passes the sampling gate. The output of combined wave samples from the sampling gate is reconstructed, according to sampling theory, by a filter with the pass-band of the combined wave frequency band, as a replica of the combined wave, from which the periodic wave of selected frequency is substantially completely eliminated.

DETAILED DESCRIPTION OF THE INVENTION

Figure 1:
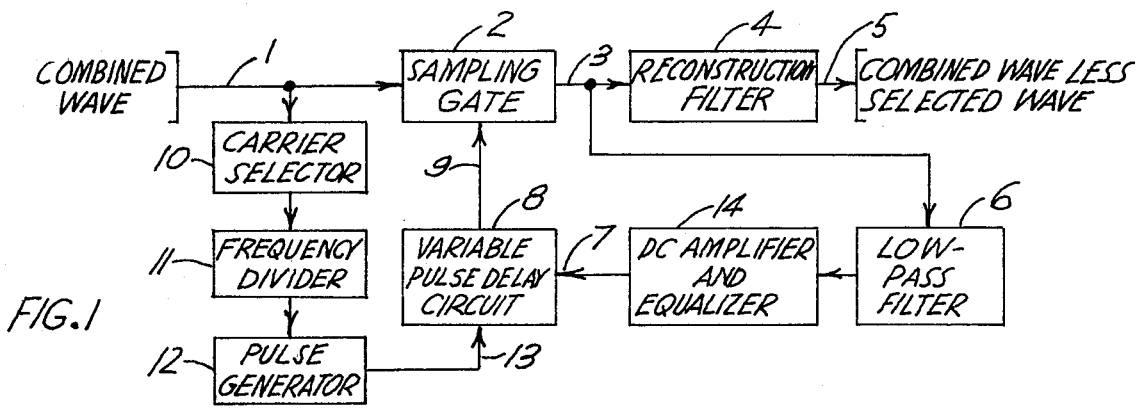
FIG. 1 shows a simplified block schematic circuit diagram of receiving apparatus according to the invention, in which the dc negative feedback is returned to a variable pulse-delay circuit.

In FIG. 1 a band-limited combined wave, comprising a selected periodic wave, such as a carrier or an amplitude modulated carrier with a selected frequency and waves, is delivered by leads 1 to sampling gate 2, and to carrier selector 10 for the periodic wave of selected frequency, which delivers a single-frequency wave of the selected frequency, substantially free other waves, by means including at least one of selectivity, amplitude limiting and oscillator synchronization, to frequency divider 11. A periodic wave is herein considered as any wave which has zero-crossings at regular intervals. Pulse generator 12 receives the output of frequency divider 11 and delivers a sequence of short pulses at a frequency equal to the frequency of the selected periodic wave divided by an integer, and greater than the Nyquist frequency for the combined wave, over lead 13, to variable pulse-delay circuit 8. Circuit 8 delays the pulses from pulse generator 12 to instants of zero-crossings of the carrier of the selected periodic wave on lead 1, and delivers the pulses over lead 9 to sampling gate 2 as gating pulses.

Sampling gate 2 delivers a sequence of short samples of the combined wave, less the selected periodic wave of selected frequency, as the samples have been taken at instants of zero-crossings of the selected periodic wave, over lead 3 to low-pass filter 6 and to reconstruction filter 4. Low-pass filter 6, which has a cut-off frequency below the frequency of modulation on the selected wave carrier, but above the frequency of fading of the selected wave, reconstructs the combined wave samples on lead 3, and passes a dc component, due to any error of timing of the sampling pulses on lead 9, through dc amplifier with delay and gain equalization 14, to delay control terminal 7 on variable pulse delay circuit 8.

Variable pulse delay circuit 8, sampling gate 2, low-pass filter 6 and dc amplifier with delay and gain equalization 14 form a negative-feedback loop, which adjusts the timing of the gating pulses on lead 9 to instants centered on zero-crossings of the selected periodic wave in sampling gate 2, with an accuracy limited only by the gain and equalization in the loop, according to well known negative-feedback theory.

Reconstruction filter 4 has a pass-band substantially the same as the frequency band of the combined wave and reconstructs and delivers the combined wave to lead 5 in analog form, substantially free from the selected periodic wave.

By means known in the prior art, such as U.S. Pat. No. 4,268,914, the selected periodic wave may be delivered, separately from the combined wave with the selected periodic wave eliminated.

Figure 2:
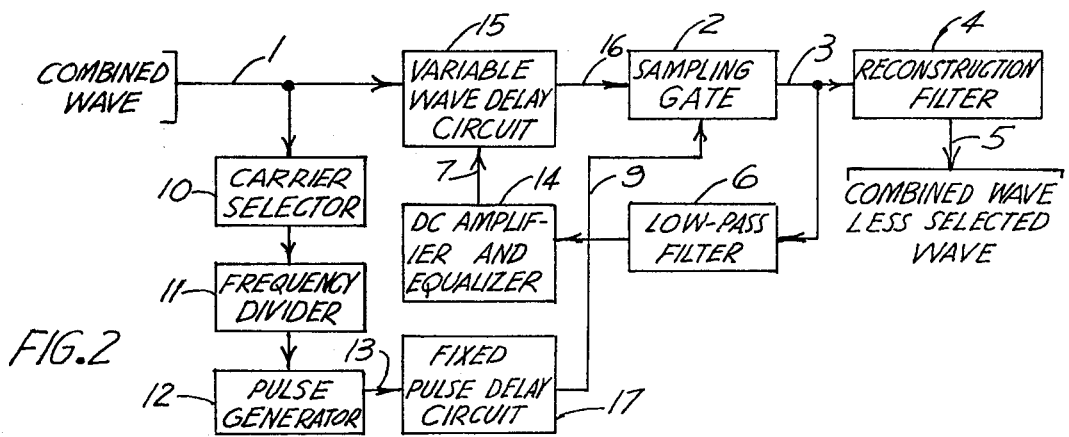
FIG. 2 shows a simplified block schematic circuit diagram of receiving apparatus according to the invention, in which the dc negative feedback is returned to a variable wave-delay circuit.

FIG. 2 shows a simplified block schematic circuit diagram of receiving apparatus according to the invention, in which the dc negative feedback is returned to a variable wave-delay circuit.

FIG. 2 is largely identical to FIG. 1, and similarly numbered elements are identical. In FIG. 2 pulse-delay circuit 17 is fixed, not variable as in pulse-delay circuit 8 in FIG. 1. In FIG. 2 a variable wave-delay circuit 15, controlled in delay over lead 7, receives the combined wave from lead 1, and delivers it, with a substantially uniform delay across the combined wave frequency band, over lead 16 to sampling gate 2, so that a zero-crossing of the carrier of the selected periodic wave arrives at sampling gate 2 at the instant at which a gating pulse arrives at sampling gate 2 over lead 9. Comments and description applicable to FIG. 1 are applicable to FIG. 2 with the exceptions above.

Since many changes could be made in the above method and constructions, and many apparently widely different embodiments of this invention could be made without departing from the scope thereof, it is intended that all matter contained in the above description or shown in the accompanying drawings shall be interpreted as illustrative only and not limiting.

We claim:

1. The method of receiving a band-limited combined wave, comprising a selected periodic wave of a selected frequency, and other waves, and delivering said combined wave substantially free from said selected periodic wave, which comprises:

sampling said combined wave for short periods centered on instants of zero-crossings of said selected periodic wave, with a gating frequency equal to the frequency of said selected periodic wave divided by an integer, and greater than the Nyquist frequency of said combined wave, and reconstructing the samples produced by said sampling to produce a direct current due to any incorrect timing of said sampling, with negligible superimposed alternating currents, and utilizing said direct current in a negative-feedback loop with direct current amplification, and delay and response equalization of alternating currents, to reduce said incorrect timing of said sampling, and reconstructing said samples to obtain said combined wave substantially free from said selected periodic wave.

2. Receiving apparatus, for a band-limited wave comprising a selected periodic wave of selected frequency and other waves, which delivers said combined wave substantially free from said selected periodic wave, which comprises:

a sampling gate which receives said combined wave and receives short gating pulses substantially centered on instants of zero-crossings of said selected periodic wave at said sampling gate, with a gating frequency equal to said selected frequency divided by an integer and greater than the Nyquist frequency for said combined wave, and a low-pass filter which receives the output of said sampling gate and delivers a direct current, due to any incorrect timing of said gating pulses, with negligible superimposed alternating currents, and a direct-current amplifier with delay and response equalizers for alternating currents which receives the output of said low-pass filter, and a carrier selector which receives said combined wave, and by at least one of selectivity, amplitude limiting and oscillator synchronization means, delivers a wave of said selected frequency, substantially free from said other waves of said combined wave, and a frequency divider which receives the output of said carrier selector, and a pulse generator which receives the output of said frequency divider and delivers a sequence of short gating pulses at a frequency equal to the frequency of said carrier divided by an integer, and greater than the Nyquist frequency of said combined wave, and a variable pulse-delay circuit which receives the output of said pulse generator and delivers said pulses as said gating pulses to said sampling gate, delayed by an amount controlled by the output of said direct-current amplifier, so that said variable pulse-delay circuit, said sampling gate, and low-pass filter, and said direct-current amplifier form a negative-feedback loop, which reduces said errors in timing of said gating pulses, according to negative-feedback theory, and a reconstruction filter which receives the output of said sampling gate, and which has a pass-band substantially the same as the frequency band of said combined wave, and which delivers said combined wave with said selected periodic wave substantially eliminated.

3. Receiving apparatus, for a band-limited wave comprising a selected periodic wave of selected frequency, and other waves, which delivers a combined wave substantially free from said selected periodic wave, which comprises:

a carrier selector which receives said combined wave, and by at least one of selectivity, amplitude limiting and oscillator synchronization means, delivers a wave of said selected frequency, substantially free from said other waves of said combined wave, and a frequency divider which receives the output of said frequency selector, and a pulse generator which receives the output of said frequency divider, and delivers a sequence of short gating pulses with a frequency equal to said selected frequency divided by an integer and greater than the Nyquist frequency for said combined wave, and a variable wave-delay circuit which receives and passes said combined wave with substantially constant delay at any instant across the frequency band of said combined wave, said delay being controlled by direct current from a direct-current amplifier, so that zero-crossings of said selected periodic wave occur at the output of said variable wave-delay circuit substantially centered on the instants of said short gating pulses from said pulse generator, and a sampling gate which receives the output of said variable wave-delay circuit, and receives said sequence of short gating pulses, and a low-pass filter which receives the output of said sampling gate and delivers a direct current, due to any incorrect timing of said sampling pulses, with negligible superimposed alternating currents, and said direct-current amplifier with delay and response equalizers for alternating currents, receiving the output of said low-pass filter, which delivers said direct current to said variable wave-delay circuit, so that said variable wave-delay circuit, said sampling gate, said low-pass filter and said direct-current amplifier form a negative-feedback circuit which reduces said errors in timing of said gating pulses, according to negative-feedback theory, and a reconstruction filter which receives the output of said sampling gate, and which has a pass-band substantially the same as the frequency band of said combined wave, and which delivers said combined wave with said selected periodic wave substantially eliminated.

* * * * *